United States Patent
Ooeda et al.

(10) Patent No.: US 8,663,822 B2
(45) Date of Patent: Mar. 4, 2014

(54) LUBRICANT LAYER THAT PROVIDES A STABLE HEAD-TO-DISK INTERFACE IN HUMID CONDITIONS

(75) Inventors: Yoshihiko Ooeda, Yokohama (JP); Yuzuru Shimazaki, Tokai-mura (JP); Mina Amo, Hitachi (JP); Yuichi Aoki, Sagamihara (JP); Robert Waltman, Gilroy, CA (US)

(73) Assignee: HGST Netherlands B.V., Amsterdam (NL)

( * ) Notice: Subject to any disclaimer, the term of this patent is extended or adjusted under 35 U.S.C. 154(b) by 156 days.

(21) Appl. No.: 13/252,962

(22) Filed: Oct. 4, 2011

(65) Prior Publication Data

US 2013/0083422 A1  Apr. 4, 2013

(51) Int. Cl.
*G11B 5/66* (2006.01)
*G11B 5/82* (2006.01)
*C07F 9/06* (2006.01)

(52) U.S. Cl.
USPC .................. 428/835.8; 508/548; 508/582

(58) Field of Classification Search
None
See application file for complete search history.

(56) References Cited

U.S. PATENT DOCUMENTS

| | | | |
|---|---|---|---|
| 5,587,217 A | 12/1996 | Chao et al. | |
| 6,605,335 B2 | 8/2003 | Tani et al. | |
| 7,026,509 B2 | 4/2006 | Russo et al. | |
| 7,060,377 B2 | 6/2006 | Liu et al. | |
| 7,371,474 B1 | 5/2008 | Liu et al. | |
| 7,670,695 B2 | 3/2010 | Wakabayashi et al. | |
| 7,772,172 B2 | 8/2010 | Liu et al. | |
| 8,039,132 B2* | 10/2011 | Shimizu et al. | 428/835.8 |
| 8,062,778 B2* | 11/2011 | Suzuki et al. | 428/835.8 |
| 2005/0037932 A1* | 2/2005 | Liu et al. | 508/458 |
| 2007/0298982 A1* | 12/2007 | Shimokawa | 508/182 |
| 2009/0209442 A1 | 8/2009 | Di Meo et al. | |
| 2009/0318664 A1* | 12/2009 | Yang et al. | 528/399 |
| 2010/0035083 A1* | 2/2010 | Yang et al. | 428/800 |
| 2010/0136371 A1 | 6/2010 | Shimizu et al. | |
| 2010/0233513 A1 | 9/2010 | Imai et al. | |
| 2010/0239887 A1* | 9/2010 | Kobayashi | 428/800 |
| 2011/0064970 A1 | 3/2011 | Chen et al. | |
| 2011/0143165 A1* | 6/2011 | Kobayashi et al. | 428/800 |

FOREIGN PATENT DOCUMENTS

| | | |
|---|---|---|
| JP | 10143836 A | 5/1998 |
| JP | 2001052327 A | 2/2001 |
| JP | 2001052328 A | 2/2001 |
| WO | 2007105437 A1 | 9/2007 |
| WO | 2010027096 A1 | 3/2010 |

* cited by examiner

*Primary Examiner* — Kevin Bernatz
(74) *Attorney, Agent, or Firm* — Zilka-Kotab, PC

(57) ABSTRACT

In one embodiment, a magnetic disk medium includes a nonmagnetic substrate, a magnetic recording layer above the nonmagnetic substrate, a protective layer above the magnetic recording layer, and a lubricant layer above the protective layer, the lubricant layer including a mixture of a compound having one or more cyclophosphazene groups and a lubricant formulated $R1-OCH_2CF_2CF_2O(CF_2CF_2CF_2O)_mCF_2CF_2CH_2O-R2$, wherein R1 and R2 are alkyl chains having at least two hydroxyl groups each, and m is an integer indicating a number of repeating units. According to another embodiment, a magnetic disk medium lubricant includes a mixture of a compound having one or more cyclophosphazene groups and a lubricant formulated as above, such that a magnetic head is provided stable flight above the lubricant layer in conditions having relative humidity of greater than about 40%.

11 Claims, 5 Drawing Sheets

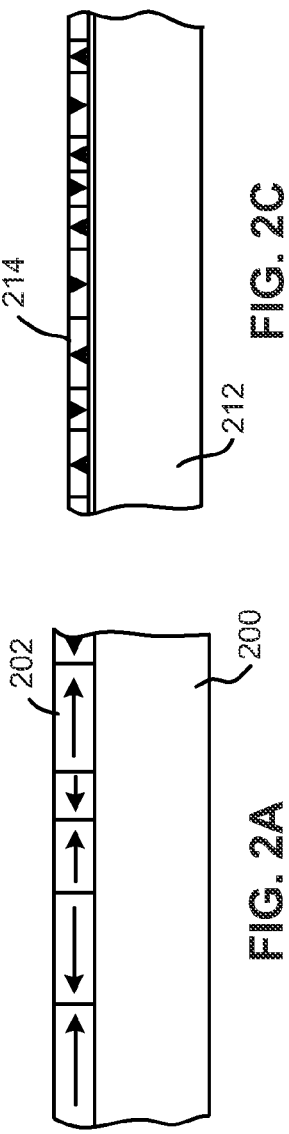
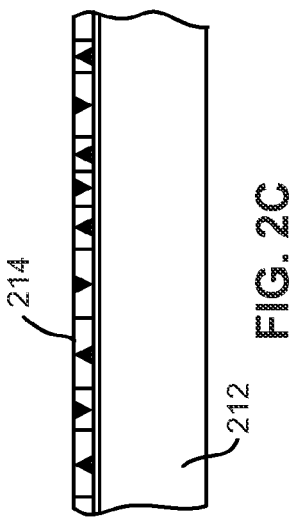
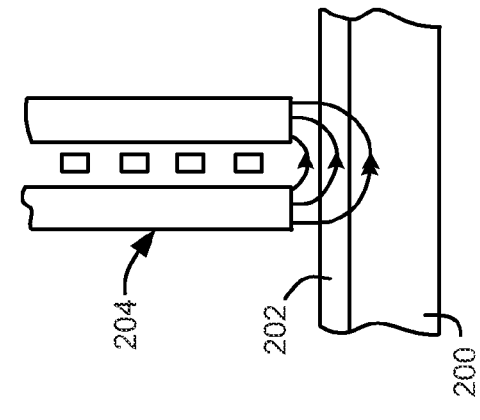
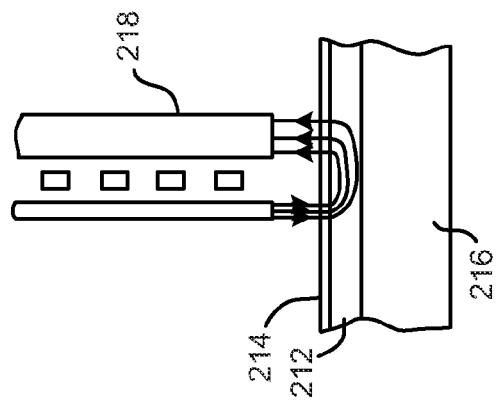
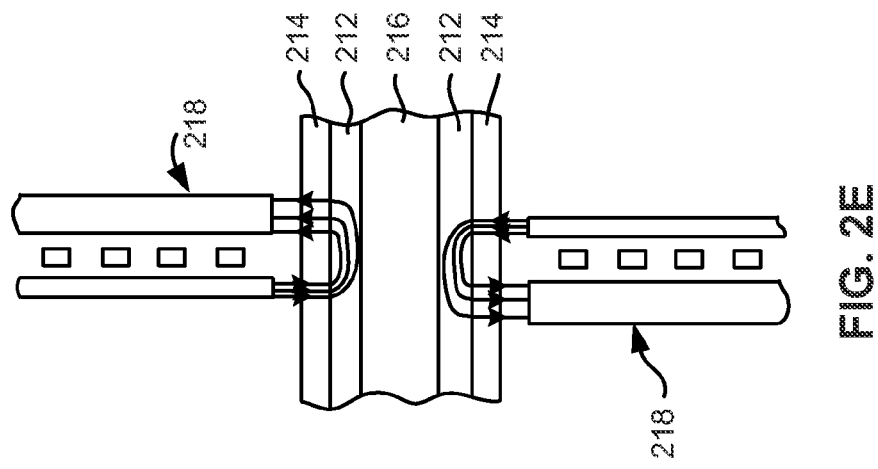

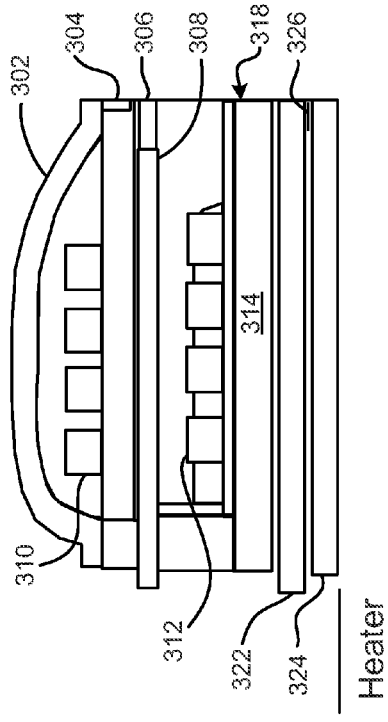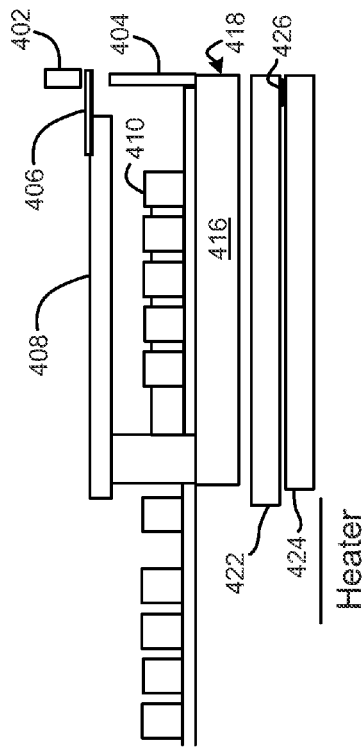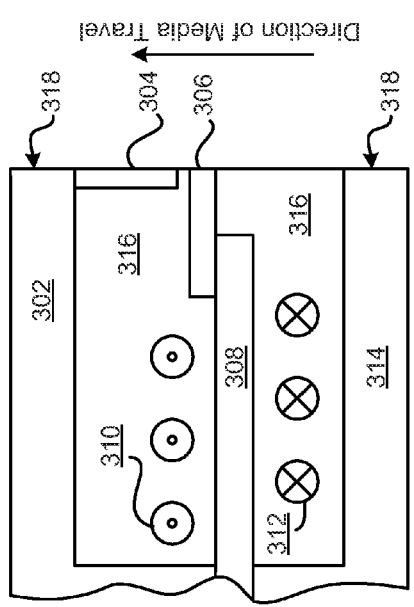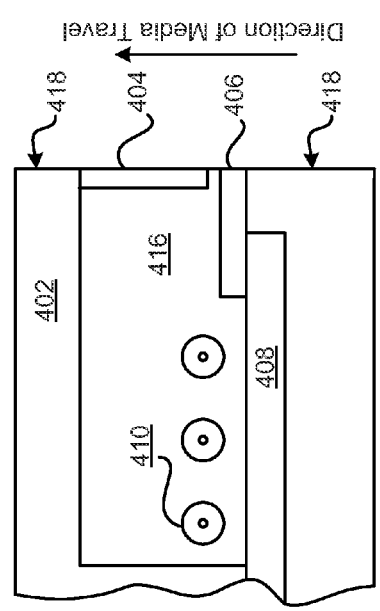

LUBRICANT LAYER THAT PROVIDES A STABLE HEAD-TO-DISK INTERFACE IN HUMID CONDITIONS

FIELD OF THE INVENTION

The present invention relates to hard disk drive data storage systems, and more particularly, this invention relates to a lubricant layer that provides a stable head-to-disk interface in humid conditions.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components, along with a reduction in the flying height of the head over the magnetic disk.

The reduction in flying height of the head over the magnetic disk under high humidity conditions is problematic because it leads to read/write instability in HDDs. Japanese Provisional Application No. JP10-14386 describes a technology for improving the contact start/stop (CSS) durability under high temperature/high humidity conditions by applying a lubricant layer having a perfluoropolyether (PFPE) lubricant and a lubricant with a cyclophosphazene group. However, the surface force, a measure of interaction between planes in near contact, of the lubricant layer prepared by the above-mentioned technology remarkably increases with a corresponding increase in humidity. Therefore, this makes it difficult to reduce the distance between head and the disk with state-of-art lubricant layers because the increase in the surface force leads to flight instability of the head during operation. The reduction in the distance between head and disk is a prerequisite to increasing the recording density of HDDs.

SUMMARY

In one embodiment, a magnetic disk medium includes a nonmagnetic substrate, a magnetic recording layer above the nonmagnetic substrate, a protective layer above the magnetic recording layer, and a lubricant layer above the protective layer, the lubricant layer including a mixture of a compound having one or more cyclophosphazene groups and a lubricant formulated R1-OCH$_2$CF$_2$CF$_2$O(CF$_2$O(CF$_2$CF$_2$CF$_2$O)$_m$CF$_2$CF$_2$CH$_2$O—R2, wherein R1 and R2 are alkyl chains having at least two hydroxyl groups each, and m is an integer indicating a number of repeating units.

In another embodiment, a magnetic disk medium includes a lubricant layer adapted for providing stable flight of a magnetic head above the lubricant layer in conditions having relative humidity of greater than about 40%.

In yet another embodiment, a magnetic disk medium lubricant includes a mixture of a compound having one or more cyclophosphazene groups and a lubricant formulated R1-OCH$_2$CF$_2$O(CF$_2$O(CF$_2$CF$_2$CF$_2$O)$_m$CF$_2$CH$_2$O—R2, wherein R1 and R2 are alkyl chains having at least two hydroxyl groups each, and m is an integer indicating a number of repeating units.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic disk medium includes a nonmagnetic substrate, a magnetic recording layer above the nonmagnetic substrate, a protective layer above the magnetic recording layer, and a lubricant layer above the protective layer, the lubricant layer including a mixture of a compound having one or more cyclophosphazene groups and a lubricant formulated $R1OCH_2CF_2CF_2O(CF_2CF_2CF_2O)_m CF_2CF_2CH_2O$—$R2$, wherein R1 and R2 are alkyl chains having at least two hydroxyl groups each, and m is an integer indicating a number of repeating units.

In another general embodiment, a magnetic disk medium includes a lubricant layer adapted for providing stable flight of a magnetic head above the lubricant layer in conditions having relative humidity of greater than about 40%.

In yet another general embodiment, a magnetic disk medium lubricant includes a mixture of a compound having one or more cyclophosphazene groups and a lubricant formulated $R1-OCH_2CF_2CF_2O(CF_2CF_2CF_2O)_m CF_2CF_2CH_2O$—$R2$, wherein R1 and R2 are alkyl chains having at least two hydroxyl groups each, and m is an integer indicating a number of repeating units.

Figure 1:
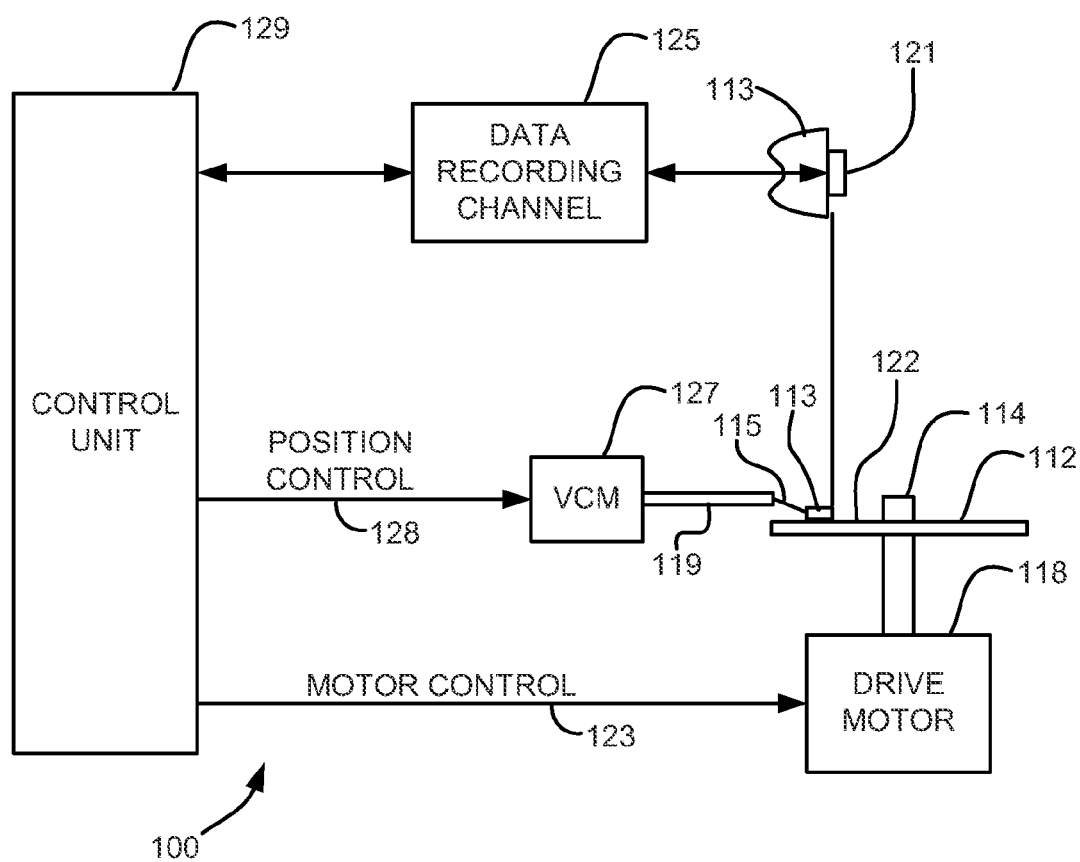
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM typically comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system embodied are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

Typically, the second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, an embodiment of a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2I) illustrates the operative relationship between a perpendicular head 218 and a recording medium. The recording medium illustrated in FIG. 2I) includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head according to one embodiment. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing according to this embodiment is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil.

Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

According to one embodiment, a magnetic disk comprises a lubricant layer that may be applied above a protective layer. The magnetic disk medium may also comprise a non-magnetic substrate and a magnetic recording layer. In some approaches, the lubricant layer comprises a mixture of a compound comprising one or more cyclophosphazene groups and a lubricant formulated as follows:

$$R1\text{-}OCH_2CF_2CF_2O(CF_2CF_2CF_2O)_mCF_2CF_2CH_2O\text{---}R2 \qquad \text{Formula (1)}$$

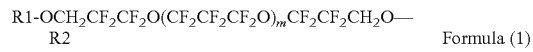

where R1 and R2 are alkyl chains having at least two hydroxyl groups each, and m is an integer indicating a number of repeating units ranging from 7 to 25. The cyclophosphazene groups comprise a phosphorus atom covalently double bonded to a nitrogen atom and single bonded to other atoms or radicals in a cyclical structure.

The adhesive force is a measure of stickiness on a surface, and according to the present embodiment, it was evaluated for the surface of a lubricant layer fabricated on a protective layer of a magnetic head. The protective layer was a carbon overcoat layer. The adhesive force was measured by atomic force microscopy. D4OH is a lubricant that has a main chain consisting of a DEMNUM perfluoropolyether oil (with a repeating $CF_2CF_2CF_2O$ unit). Z-DOL and A20H are also lubricants which have a main chain of a FOMBLIN perfluoropolyether structure (having a repeating $CF_2CF_2O$ unit).

Figure 5:
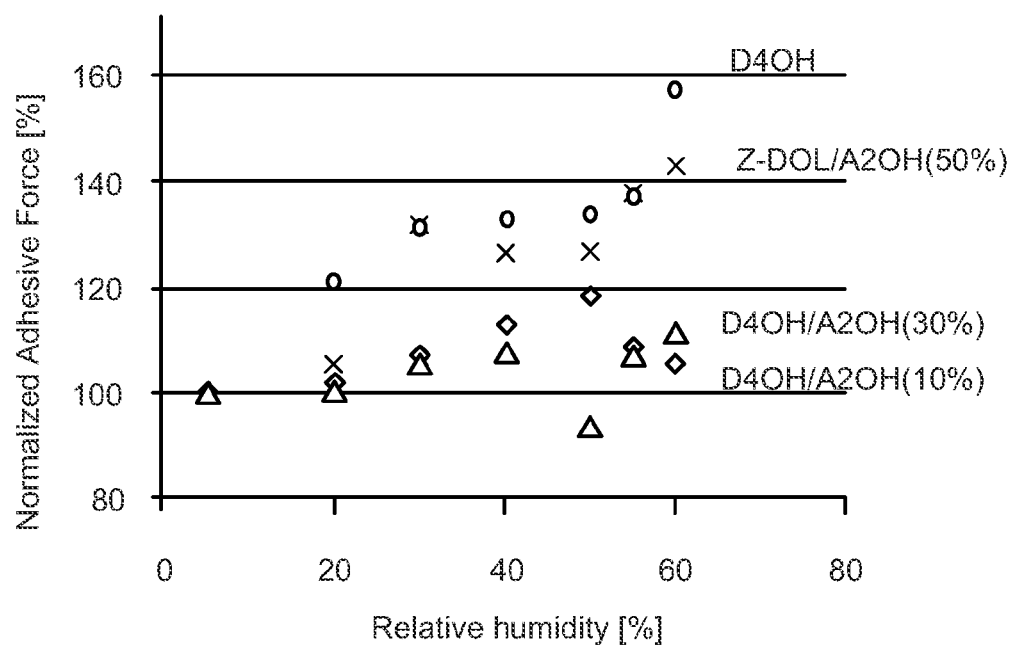
FIG. 5 shows results of humidity dependence of an adhesive force for various lubricant compounds.

FIG. 5 shows the results of the embodied humidity dependence of the adhesive force for these various compounds. The measurement was performed at 40° C. The adhesive force increased with a corresponding increase in humidity for the neat D4OH lubricant layer and the Z-DOL/A20H (50%) lubricant layer. However, an increase in adhesive force was suppressed by the addition of A20H into the D4OH lubricant layer.

The increase in adhesive force due to humidity is partly explained by an apparent increase in surface energy by water uptake of the main chain of the lubricant layer exposed to the outer surface. Table 1 shows water uptake of the various lubricants. In Table 1, the bulk hydroscopicity is defined as the number of water molecules divided by the number of lubricant molecules in a given sample of lubricant. The bulk hydroscopicity was measured by hydrogen-1 nuclear magnetic resonance ($^1$H-NMR).

TABLE 1

Moisture Absorption

| Lubricant Layer | Bulk Hydroscopicity |
| --- | --- |
| D4OH | 2.58 |
| Z-TETRAOL | 5.21 |
| Z-DOL | 0.26 |
| A20H | 0.02 |

The water uptakes were evaluated for the lubricants after being exposed to humid air for 14 days. Because D40H and Z-TETRAOL have the same number of hydrophilic OH groups, the comparison of water uptake between D40H and Z-TETRAOL leads to the comparison of water uptake between the FOMBLIN structure and the DEMNUM structure. The results in Table 1 show that D40H absorbed less water than Z-TETRAOL. Therefore, the DEMNUM structure absorbs less water than the FOMBLIN structure. Meanwhile, the water uptake of A20H is very small at 0.02 even though it includes the FOMBLIN structure. One explanation for this occurrence is the existence of the hydrophobic cyclophosphazene group, which repels water molecules, and may explain the small amount of water uptake of A20H.

From the discussion above, a lubricant layer comprising the DEMNUM structure and a lubricant with at least one cyclophosphazene group takes up less water and hence displays a stable adhesive force even in humid conditions. This leads to flight stability of the head under a wide range of humidity conditions. According to the methods and structures disclosed herein, a magnetic disk that can be used for in a HDD having a higher record density where a distance between the head and the disk is as small as 1 nm may withstand high humidity conditions. High humidity conditions may be any conditions where the humidity is greater than about 20% in relative humidity, greater than about 40% in relative humidity, greater than about 50% in relative humidity, etc.

According to various embodiments, the increase in the surface force on the disk under high temperature/high humidity conditions is controlled, and the change in distance between the head and the disk under high temperature/high humidity conditions is minimized. Therefore, a magnetic disk that can be used for in a HDD having a higher record density where a distance between the head and the disk is as small as about 1 nm may be provided.

Figure 6A:
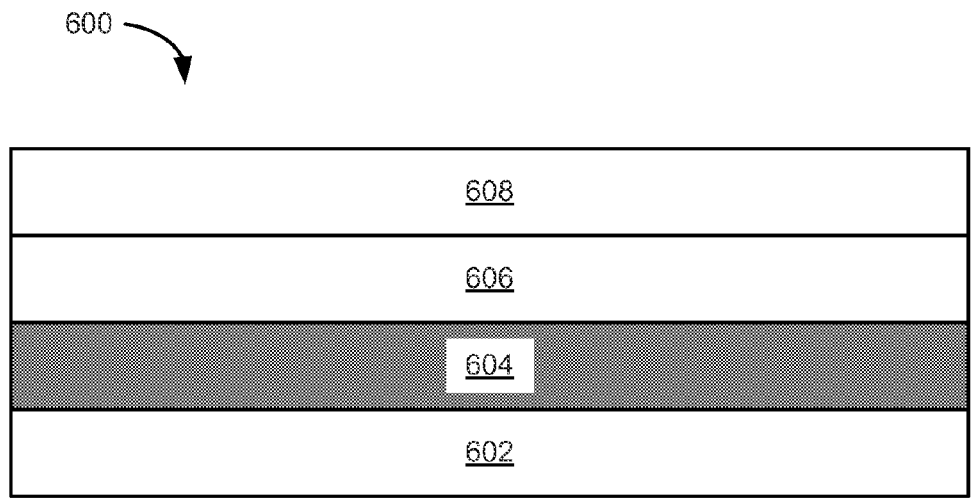
FIG. 6A shows a magnetic disk medium according to one embodiment.

Now referring to FIG. 6A, a magnetic disk medium 600 is shown according to one embodiment. The medium 600 comprises a nonmagnetic substrate 602, a magnetic recording layer 604 above the nonmagnetic substrate 602, a protective layer 606 above the magnetic recording layer 604, and a lubricant layer 608 above the protective layer 606.

Figure 6B:
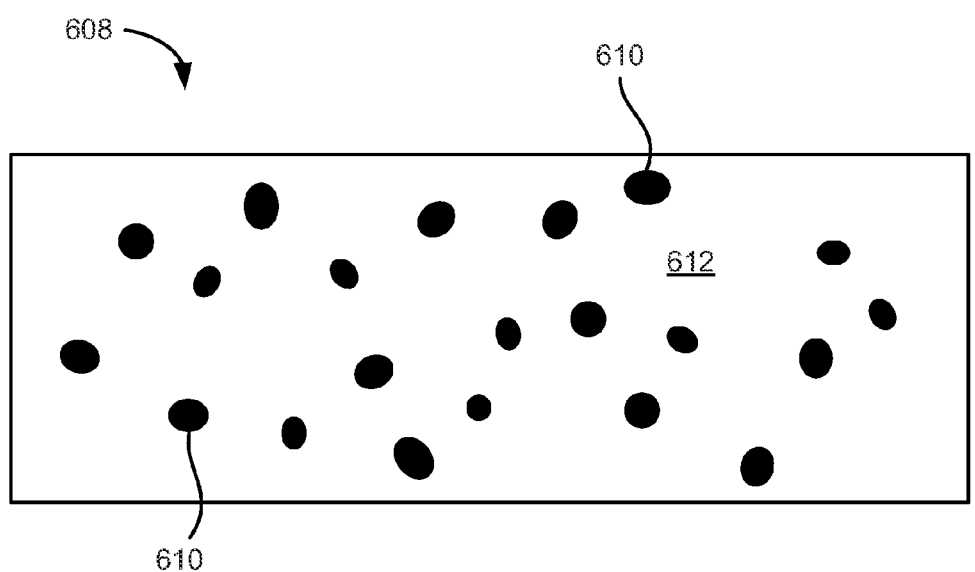
FIG. 6B shows a lubricant layer according to one embodiment.

As shown in FIG. 6B, the lubricant layer 608 may comprise a mixture of a compound 610 comprising one or more cyclophosphazene groups and a lubricant 612 formulated as follows:

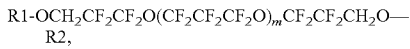
R1-OCH$_2$CF$_2$CF$_2$O(CF$_2$CF$_2$CF$_2$O)$_m$CF$_2$CF$_2$CH$_2$O—R2, wherein R1 and R2 are alkyl chains having at least two hydroxyl groups each, and m is an integer indicating a number of repeating units. In one embodiment, m may be in a range from 7 to 25.

In one embodiment, the lubricant layer may be adapted for providing stable flight of a magnetic head above the lubricant layer 608 in conditions having relative humidity of greater than about 10%, 20%, 40%, 60% or greater.

In another embodiment, the medium 600 may be included in a magnetic data storage system, such as that shown in FIG. 1. The magnetic data storage system may also comprise at least one magnetic head, a drive mechanism for passing the magnetic disk medium over the at least one magnetic head, and a controller electrically coupled to the at least one magnetic head for controlling operation of the at least one magnetic head.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic disk medium, comprising:
a nonmagnetic substrate;
a magnetic recording layer above the nonmagnetic substrate;
a protective layer above the magnetic recording layer; and
a lubricant layer above the protective layer, the lubricant layer comprising a mixture of a compound comprising one or more cyclophosphazene groups and a lubricant formulated as follows:

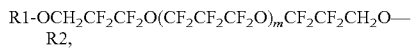
R1-OCH$_2$CF$_2$CF$_2$O(CF$_2$CF$_2$CF$_2$O)$_m$CF$_2$CF$_2$CH$_2$O—R2, wherein R1 and R2 are alkyl chains having at least two hydroxyl groups each, and m is an integer indicating a number of repeating units,
wherein the lubricant layer is physically characterized as providing stable flight of a magnetic head above the lubricant layer in conditions having relative humidity of greater than about 40% as determined by a change in normalized adhesive force of less than or equal to about 20% relative to the adhesive force at 0% relative humidity when measured at 40° C.

2. The magnetic disk medium as recited in claim 1, wherein m is in a range from 7 to 25.

3. A magnetic data storage system, comprising:
at least one magnetic head;
a magnetic disk medium as recited in claim 1;
a drive mechanism for passing the magnetic disk medium over the at least one magnetic head; and
a controller electrically coupled to the at least one magnetic head for controlling operation of the at least one magnetic head.

4. A magnetic disk medium, comprising a lubricant layer physically characterized as providing stable flight of a magnetic head above the lubricant layer in conditions having relative humidity of greater than about 40% as determined by a change in normalized adhesive force of less than or equal to about 20% relative to the adhesive force at 0% relative humidity when measured at 40° C.,
wherein the lubricant layer comprises a mixture of a compound comprising one or more cyclophosphazene groups and a lubricant formulated as follows:

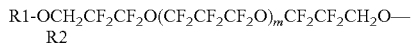
R1-OCH$_2$CF$_2$CF$_2$O(CF$_2$CF$_2$CF$_2$O)$_m$CF$_2$CF$_2$CH$_2$O—R2 wherein R1 and R2 are alkyl chains having at least two hydroxyl groups each, and m is an integer indicating a number of repeating units ranging from 7 to 25.

5. The magnetic disk medium as recited in claim 4, wherein the lubricant layer is physically characterized as providing stable flight of a magnetic head above the lubricant layer in conditions having relative humidity of greater than about 60%.

6. A magnetic data storage system, comprising:
at least one magnetic head;
a magnetic disk medium as recited in claim 4;
a drive mechanism for passing the magnetic disk medium over the at least one magnetic head; and
a controller electrically coupled to the at least one magnetic head for controlling operation of the at least one magnetic head.

7. A magnetic disk medium lubricant, the lubricant comprising a mixture of a compound comprising one or more cyclophosphazene groups and a lubricant formulated as follows:

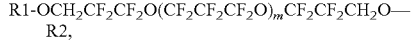
R1-OCH$_2$CF$_2$CF$_2$O(CF$_2$CF$_2$CF$_2$O)$_m$CF$_2$CF$_2$CH$_2$O—R2, wherein R1 and R2 are alkyl chains having at least two hydroxyl groups each, m is an integer indicating a number of repeating units, and wherein the lubricant is physically characterized as providing stable flight of a magnetic head above the lubricant in conditions having relative humidity of greater than about 40% as determined by a change in normalized adhesive force of less than or equal to about 20% relative to the adhesive force at 0% relative humidity when measured at 40° C.

8. The magnetic disk medium lubricant as recited in claim 7, wherein m is in a range from 7 to 25.

9. A magnetic data storage system, comprising:
at least one magnetic head;
a magnetic disk medium having the lubricant as recited in claim 7 thereon;
a drive mechanism for passing the magnetic disk medium over the at least one magnetic head; and
a controller electrically coupled to the at least one magnetic head for controlling operation of the at least one magnetic head.

10. The magnetic disk medium lubricant as recited in claim 9, wherein the lubricant is applied to an upper surface of the magnetic disk medium.

11. The magnetic disk medium lubricant as recited in claim 10, wherein the lubricant is physically characterized as providing stable flight of a magnetic head above the lubricant in conditions having relative humidity of greater than about 60%.

* * * * *

UNITED STATES PATENT AND TRADEMARK OFFICE
CERTIFICATE OF CORRECTION

PATENT NO.          : 8,663,822 B2
APPLICATION NO.     : 13/252962
DATED               : March 4, 2014
INVENTOR(S)         : Yoshihiko Ooeda et al.

It is certified that error appears in the above-identified patent and that said Letters Patent is hereby corrected as shown below:

In the specification:

replace col. 2, line 11 with --$R1\text{-}OCH_2CF_2CF_2O(CF_2CF_2CF_2O)_mCF_2CF_2CH_2O\text{-}R_2$--;

col. 3, line 21 replace "$R1OCH_2$" with --$R1\text{-}OCH_2$--;

col. 4, line 62 replace "FIG. 21" with --FIG. 2D--;

col. 4, line 64 replace "FIG. 21" with --FIG. 2D--.

Signed and Sealed this
Tenth Day of June, 2014

Michelle K. Lee
*Deputy Director of the United States Patent and Trademark Office*